United States Patent [19]

Jones, Jr. et al.

[11] 4,075,269

[45] Feb. 21, 1978

[54] PROCESS FOR PRODUCING WHOLLY AROMATIC POLYAMIDE FIBERS OF HIGH STRENGTH

[75] Inventors: Rufus S. Jones, Jr., Randolph; Marshall Tan, Ridgefield Park; Eui Won Choe, Randolph, all of N.J.

[73] Assignee: Celanese Corporation, New York, N.Y.

[21] Appl. No.: 726,089

[22] Filed: Sept. 23, 1976

[51] Int. Cl.$^2$ ............................................... D01D 5/12
[52] U.S. Cl. ................................. 264/184; 260/78 A; 260/78 R; 260/78 SC; 264/210 F; 264/236; 264/205
[58] Field of Search .............. 260/78 R, 78 A, 78 SC; 264/184, 236, 205, 210 F

[56] References Cited

U.S. PATENT DOCUMENTS

| | | | |
|---|---|---|---|
| 3,821,168 | 6/1974 | Keil | 260/49 |
| 3,849,376 | 11/1974 | Wolf et al. | 260/78 R |
| 3,862,088 | 1/1975 | Wolf et al. | 260/78 A |
| 3,869,429 | 3/1975 | Blades | 260/78 R |
| 3,869,430 | 3/1975 | Blades | 260/78 R |
| 3,870,685 | 3/1975 | Jones et al. | 260/78 R |
| 3,901,854 | 8/1975 | Jones | 260/78 R |
| 3,923,750 | 12/1975 | Jones | 260/78 R |
| 3,931,119 | 1/1976 | Leblanc | 260/78 R |
| 3,991,016 | 11/1976 | Morgan | 260/78 A |

*Primary Examiner*—Jay H. Woo

[57] ABSTRACT

An improved process for preparing wholly aromatic polyamide fibers of high performance charcteristics is provided. The process includes the steps of providing a spinning solution of a wholly aromatic polyamide, the polyamide having a sulfur content as sulfonic acid and-/or sulfonate groups attached to the aromatic nuclei of at least 0.5 percent by weight based on the weight of the polyamide; spinning the spinning solution of the wholly aromatic polyamide to produce an as-spun fiber having an inherent viscosity of at least 1.0; and heat treating the as-spun fiber under sufficient tension to maintain a constant length or to elongate the fiber up to about 5 percent of the as-spun length while heating within a range of about 150° C. to about 650° C. The resulting fibers have a tenacity of at least 15 grams per denier, an elongation of at least 1.5 percent, and an initial modulus of at least 400 grams per denier.

32 Claims, No Drawings

PROCESS FOR PRODUCING WHOLLY AROMATIC POLYAMIDE FIBERS OF HIGH STRENGTH

BACKGROUND OF THE INVENTION

This invention relates to a process for preparing wholly aromatic polyamide fibers of high performance characteristics, particularly, high tenacity, and relates, more specifically, to a process for preparing high strength fibers from wholly aromatic polyamides which may be of a relatively low inherent viscosity (hereinafter: I.V.).

Fibers produced from wholly aromatic polyamides have found increased utility in recent years as reinforcements in high grade reinforced plastic composites, V-belts, tires, i.e., as tire cords, and the like. For use in such applications the wholly aromatic polyamide fibers are required to have high tensile strength and modulus. According to the prior art, aromatic polyamide fibers of good strength have been produced, for example, by the use of optically anisotropic dopes of certain carbocyclic aromatic polyamides in wet spinning processes (U.S. Pat. No. 3,671,542) and by the use of aromatic polyamides of high I.V. The production of wholly aromatic polyamides of high I.V. is undesirable from an economic standpoint, however, due to the longer polymerization times, the particular reactants and the special reaction conditions that are generally required to produce such polymers.

It is an object of the present invention, therefore, to provide an economical process for preparing wholly aromatic polyamide fibers having high performance characteristics.

It is another object of the present invention to provide a process for preparing wholly aromatic polyamide fibers of high strength employing a wholly aromatic polyamide of relatively low I.V.

These and other objects, as well as the scope, nature, and utilization of the present invention will be apparent to those skilled in the art from the following description and from the appended claims.

In Applicants' copending application (U.S. Ser. No. 726,090) filed concurrently herewith, entitled "High Performance Wholly Aromatic Polyamide Fibers" is claimed the improved fibrous material which may be formed by the process of the present invention.

SUMMARY OF THE INVENTION

It has been found that an improved process for preparing wholly aromatic polyamide fibers comprises:

a. providing a spinning solution containing from about 10 to 30 percent by weight of a wholly aromatic polyamide having (1) chain extending bonds from the aromatic nuclei thereof which are coaxial or parallel and oppositely directed, and (2) a sulfur content of at least 0.5 percent by weight as sulfonic acid and/or sulfonate groups attached to the aromatic nuclei of the wholly aromatic polyamide;

b. solution spinning the spinning solution of the wholly aromatic polyamide through a spinning jet to provide as-spun fibers having an inherent viscosity of at least 1.0; and c. thermally treating the as-spun fibers at a temperature within the range of about 150° to 650° C. while under a longitudinal tension sufficient to maintain a constant length or to elongate the fibers up to about 5 percent of the as-spun length thereby producing fibers having a single filament tenacity of at least 15 grams per denier, an elongation of at least 1.5 percent, and an initial modulus of at least 400 grams per denier.

DESCRIPTION OF PREFERRED EMBODIMENT

The process according to the present invention is carried out employing a wholly aromatic polyamide (as described) having a sulfur content (as described) of at least 0.5 percent by weight based on the weight of the polymer. It has been found that at a sulfur content much below about 0.5 percent by weight the desired properties are not observed in the resulting fibers when practicing the process of the present invention. The sulfur is present in the wholly aromatic polyamide in the form of sulfonic acid groups and/or sulfonate groups attached to the aromatic rings. The minimum sulfur content of about 0.5 percent by weight generally corresponds to at least about 2.5 percent of the aromatic rings or about 5 percent of the polymer repeat units having sulfonic acid and/or sulfonate groups attached thereto. The maximum sulfur content is about 10 percent by weight. Commonly the wholly aromatic polyamide employed has a sulfur content of about 0.5 to 3 percent by weight, preferably 0.8 to 1.7 percent by weight, and most preferably about 0.8 to 1.3 percent by weight. At such particularly preferred sulfur contents there has been found to be an optimum balance between processability and ultimate fiber properties.

The aromatic polyamides useful in the present process of the invention have chain extending bonds from the aromatic nuclei thereof which are coaxial or parallel and oppositely directed. By the expression "extended bonds" is meant chain extending bonds of the radical (as determined by true bond angles) which are essentially coaxial as in p-phenylene

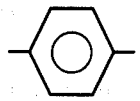

or parallel as in 1,5-naphthylene

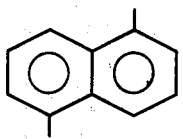

and oppositely directed.

Additionally, the aromatic polyamides useful in the process of the invention have recurring structural units of the formula:

$$-\overset{H}{\underset{|}{N}}-Ar-\overset{H}{\underset{|}{N}}-\overset{O}{\underset{\|}{C}}-Ar-\overset{O}{\underset{\|}{C}}-$$

wherein Ar is a divalent aromatic radical having the required chain extending bonds selected from the group consisting of

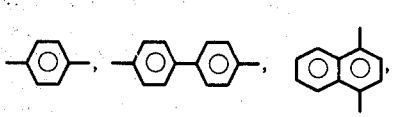

-continued

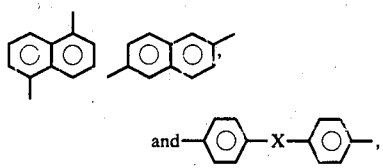

where

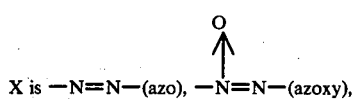

X is —N=N—(azo), —N=N—(azoxy), ethylene, or acetylenyl. Alternatively, up to about 10 percent by weight of the aromatic radicals Ar may be of a structure which does not conform to the above description provided the structure thereof does not render the wholly aromatic polyamide incapable of exhibiting the minimum fiber strength, elongation, and modulus properties discussed hereafter.

In the first step of the process of this invention a spinning solution of a wholly aromatic polyamide having the specified sulfur content attached to the aromatic nuclei is provided. The spinning solution may be formed by first preparing a sulfonated wholly aromatic polyamide by conventional polymerization procedures and then dissolving the polyamide in a suitable spinning solvent. Alternatively, a wholly aromatic polyamide having the recurring structural units specified above and which is not substituted by sulfonic acid and/or sulfonate groups may be sulfonated by dissolving the polymer in sulfuric acid (either concentrated or fuming) where the desired sulfonation reaction occurs as will be explained more fully below.

The wholly aromatic polyamides, both those having sulfonic acid and/or sulfonate groups and those not being substituted by such groups may be prepared from the appropriate co-reactants by polymerization procedures which, themselves, are known in the art. For example solution polymerization procedures similar to those described in Kwolek et al, U.S. Pat. No. 3,671,542 may be employed. In the solution polymerization procedure, one or more aromatic diamines are reacted with polyamide-forming derivatives of aromatic dicarboxylic acids. The aromatic dicarboxylic acid is conveniently employed in the form of its dihalide which is readily prepared by well-known methods; the diacid chloride being generally preferred. The solution polymerization itself is conventionally accomplished by first preparing a cooled solution of the diamine or diamines, in an appropriate solvent, such as, for example, an amide-type solvent such as hexamethylphosphoramide, N-methylpyrrolidone-2, N, N-dimethylacetamide, and/or N,N,N',N'-tetramethylurea. The diacid chloride is added to the diamine solution, usually with stirring and cooling. Other methods of preparing the wholly aromatic polyamides useful in the process of the invention include, for example, those described in U.S. Pat. Nos. 3,819,587, 3,870,685 and 3,901,854.

The sulfonated wholly aromatic polyamide may be prepared from the appropriate sulfonated diamine or diacid derivatives, or mixtures of these. The sulfonated diamines, however, are generally preferred because of their ready availability and lower cost. The use of mixtures of sulfonated monomers with non-sulfonated monomers is usual since the sulfur content of the polyamides useful in the process of this invention does not require that all of the aromatic groups be substituted by the sulfonic acid and/or sulfonate groups. Thus, for example, a preferred aromatic polyamide may be prepared from a diamine mixture containing 10 percent by weight of 2,5-diaminobenzene sulfonic acid and 90 percent by weight of para-phenylenediamine, the diamine mixture being reacted with a suitable terephthalic acid derivative.

Non-limiting examples of aromatic diamines useful in preparing the aromatic polyamides employed in the process of the invention include:

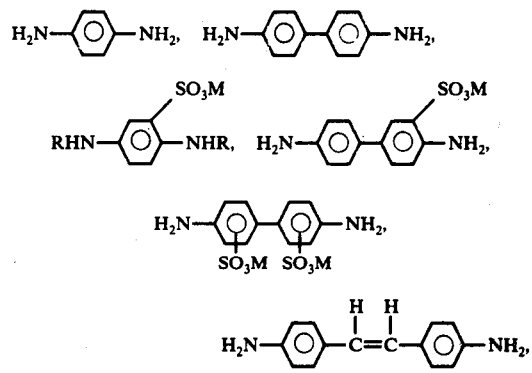

etc., where R = H, —CH$_3$ or —C$_6$H$_5$, and M = H, Li, Na, K, Ca, Ba, or —CH$_3$.

Non-limiting examples of aromatic dicarboxylic acids or their derivatives useful in preparing the aromatic polyamides employed in the process of the invention include:

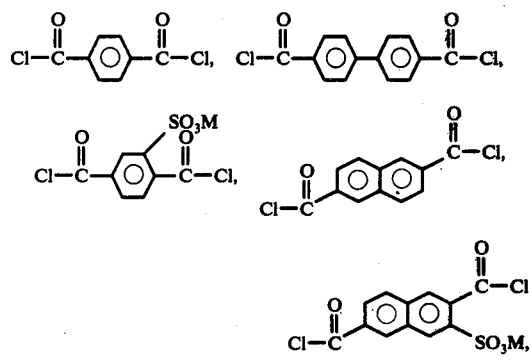

etc., where M = H, Li, Na, K, Ca, Ba, or —CH$_3$. Particularly useful monomers are

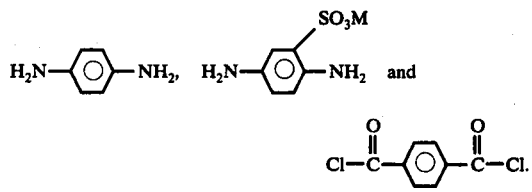

Alternatively, an appropriate unsubstituted, i.e., non-sulfonated wholly aromatic polyamide may be sulfonated to the desired sulfur content in concentrated or fuming sulfuric acid. Concentrated sulfuric acid of at least about 96 percent by weight sulfuric acid has been found to be required to produce the desired sulfonation at a practical rate. A preferred concentrated sulfuric acid contains about 98 to 100 percent by weight sulfuric acid. To achieve the requisite degree of sulfonation, i.e., a wholly aromatic polyamide having a sulfur content of at least about 0.5 percent by weight (as described), the polyamide may be treated while dissolved in concentrated sulfuric acid at a temperature of about 75° to 95° C. for a period of about 14 to 50 hours. Alternatively, the wholly aromatic polyamide may be treated while dissolved in fuming sulfuric acid at a temperature not exceeding about 25° C. (e.g. 10° to 25° C.) for a period not exceeding about 1 hour (e.g. about 0.5 to 1 hour).

The molecular weight of the sulfonated aromatic polyamide to be employed in the process of the invention is such that the as-spun fiber (which is defined below) has an I.V. of at least 1, e.g. from about 1.0 to about 7.0 (or 1.0 to 3.0). As employed herein, I.V., or inherent viscosity ($\eta_{inh}$) is determined in accordance with the following equation:

$$\eta_{inh} = (\ln\eta_{rel})/C$$

The relative viscosity ($\eta_{rel}$) is determined by dividing the flow time in a capillary viscometer of a dilute solution of the polymer by the flow time for the pure solvent. The concentration (C) is 0.4 gram of polymer per 100 cc of concentrated (about 97 to 99 percent) $H_2SO_4$.

In the initial step of the process according to the invention, a spinning solution of a sulfonated wholly aromatic polyamide suitable for spinning into fibers is provided. The sulfonated aromatic polyamides can be processed into useful spinning solutions in a conventional manner. Generally, the desird wholly aromatic polyamide is isolated after its formation and then is dissolved in a suitable medium to form the spinning solution. In particular embodiments the polymerization medium itself may be used in forming the spinning solution. For example, the amide-type solvents used in solution polymerizations form excellent spinning dopes.

Useful dopes or spinning solutions for fiber formation comprise from about 10 to about 30 percent by weight (e.g. 18 to 23 percent by weight) of the sulfonated aromatic polyamide combined with a liquid or a mixture of liquids, for example, hexamethylphosphoramide; N-methylpyrrolidone-2; N,N-dimethylacetamide; N,N,N',N'-tetramethylurea; tetramethylene sulfone; or strong acids such as sulfuric acid; chlorosulfonic acid; and hydrofluoric acid.

The preparation of the spinning solution when employing the amide-type solvents may be assisted by the addition of lithium chloride to the solvent. Also spinning solution preparation is assisted by the application of heat, or vigorous agitation as will be apparent to those skilled in the art.

When the wholly aromatic polyamide is sulfonated in concentrated or fuming sulfuric acid, the resultant solution may be used directly as the spinning dope. For instance, the spinning dope may be an 18 to 23 percent by weight solution of the wholly aromatic polyamide in 96 to 105 percent by weight sulfuric acid.

The spinning solution of the sulfonated aromatic polyamide is solution spun through a spinning jet to form fibers by conventional techniques and equipment. In wet-spinning, the dope is extruded at a suitable temperature, generally 0° to about 100° C., into a suitable coagulating bath. The coagulating medium employed in the coagulating bath will depend upon the solvent employed in the preparation of the dope. When sulfuric acid is employed as the solvent in the dope, the coagulant is generally water or dilute sulfuric acid. The coagulating bath is normally maintained at a temperature of about −20° to +90° C. So-called dry jet wet-spinning has been found to be particularly useful in the spinning step. In dry jet wet-spinning the fibers are extruded from a spinneret through an air gap and then into the coagulating bath. Dry-spinning of dopes of organic solvents may be accomplished by extruding the compositions or dopes of the invention into a heated current of gas whereby evaporation occurs and filaments of the polyamide are formed.

After being formed, the fibers may be passed to a take-up unit, the speed of the take-up roll of which may be adjusted such that the rate of wind-up commonly is from 2 to 6 times (e.g. 3 to 5 times) greater than the theoretical jet speed. As is well known to those skilled in the art, the theoretical jet speed may be calculated from the volumetric rate of the polymer solution through the extruding cylinder and the number and size of the spinneret orifices of the spinning jet.

The as-spun fibers preferably are thereafter washed to remove residual solvent and/or salts and thereafter are dried.

The fibers produced in the spinning step of the process and which are referred to as "as-spun" fibers have an I.V. of from about 1.0 to 7.0, and commonly 1.0 to 3.0 (as measured using a solution of 0.4 grams of product per 100 ml. of concentrated sulfuric acid of 97 to 99 percent by weight at 25° C.).

The terminology "as-spun" is used herein to define fibers formed in the spinning step following take-up which have not been subjected to a drawing or heat-treating operation which changes the molecular order or arrangement of the polymer molecules. The fibers, however, may be subjected to washing and drying operations needed to remove solvents or impurities.

The as-spun fibers commonly exhibit a single filament tenacity on the order of 10 grams per denier, an elongation of about 2½ percent, and an initial modulus of about 200 grams per denier. The tenacity and initial modulus properties of the fibers increase dramatically, however, and to an extent that is greater than would be expected in view of the molecular weight, or I.V. of the as-spun fiber, by thermally treating the as-spun fiber as described hereafter.

The thermal treatment of the as-spun fibers is carried out by means conventional in the art such as, for example, through the use of hot air ovens, hot pins, hot slots, hot plates, liquid heating baths, and the like. The heat treatment is commonly carried out in an atmosphere of an inert gas, such as nitrogen, argon, or helium. Heating is generally within a range of about 150° to 650° C., and preferably 350° to 550° C., and most preferably 450° to 500° C., while the as-spun fibers are under a longitudinal tension sufficient to maintain a constant length or to elongate the fibers up to about 5 percent of the as-spun length. Thermal treatment residence times of about 1.5 second to 1 minute, e.g. 3 to 9 seconds, commonly are selected. In particularly preferred embodiments the as-spun fiber is elongated up to about 3 percent of its as-spun length (e.g. from about 0.2 to 0.6 percent of its as-spun length).

The fibers produced according to the process of the invention after the thermal treatment possess outstanding tensile properties. In particular the fibers possess a tenacity of at least 15 grams per denier (e.g. 17 to 28 and typically greater than about 18 grams per denier; an elongation of at least 1.5 percent and typically greater than about 2 percent (e.g. 2 to 3.5 percent); an initial modulus of at least 400 grams per denier and typically higher than about 700 grams per denier (e.g. 600 to 1200 grams per denier); and an I.V. of about 2.0 to 4.0. The large increase in the physical properties, upon heat treatment of the as-spun sulfonated aromatic polyamide fibers according to the process of the present invention is unexpected. The increase in tenacity is considered to be particularly unique.

The fibers formed by the process of the present invention exhibit relatively high crystallinity and orientation and exhibit particularly good resistance to organic solvents. They continue to exhibit high performance tensile properties even at elevated temperatures (e.g. at 150° C.). The fibers also show improved resistance to burning as compared to unsubstituted aromatic polyamide fibers.

The fiber tensile properties of tenacity, elongation, and initial modulus are reported herein in their conventional units, i.e., grams per denier, percent, and grams per denier, respectively. These properties of single filaments may be conveniently measured in accordance with ASTM operational specification D-7653 (October, 1962) utilizing a testing machine such as an Instron Tester using a gauge length of one inch at a 20 percent per minute strain rate. Fiber samples may be conditioned prior to testing by storage for about 12 hours in air at 65 percent relative humidity maintained at 70° F. The chemical structure of the sulfonated wholly aromatic polyamides can be confirmed by X-ray analysis, and standard elemental analysis techniques.

The invention will be more fully described by reference to the examples below which illustrate certain preferred embodiments.

wind-up was 3 times greater than the theoretical jet speed. The theoretical jet speed was calculated from the volumetric through rate of polymer solution in the extrusion cylinder and from the number and size of the spinneret orifices.

The as-spun fibers having an inherent viscosity of 2.7 were thereafter washed in a base solution and then washed with water to remove residual sulfuric acid. Both steps were carried out batchwise. The washed yarns were then air dried.

The dried fibers were thereafter passed through a tube heated to a temperature of 250° C., 300° C., 350° C., 400° C., 450° C., or 500° C. for a residence time of about 6 seconds while blanketed with nitrogen and under a tension such that they were elongated 1.005 times (0.5 percent) their as-spun length.

The single filament properties of the resulting fibers are reported in Table I, as are the properties of a control wherein the washed and dried as-spun fibers were not subjected to the heat treatment.

The following abbreviations are utilized in Table I, as well as in the other tables which follow:

| | |
|---|---|
| DPF | = denier per filament |
| Ten | = tenacity |
| Elong | = elongation |
| g/d | = grams per denier |
| TE[i] | = tensile factor or index of fiber organization wherein T is tenacity at break in grams per denier and E is elongation of percent extension from original length at break in tensile test. An explanation of this test and its significance is given in the Textile Research Journal, 36, No. 7, pages 593–602, July 1966. |
| Mod | = modulus |

TABLE I

| Fiber Sample | Heat Treatment Stretch Percent | Heat Treatment Temp °C | DPF | Fiber Properties Ten, g/d | Elong, % | TE[i] | Mod, g/d |
|---|---|---|---|---|---|---|---|
| Control | — | — | 2.65 | 10.4 | 3.02 | 18.1 | 450 |
| IA | 0.5 | 250 | 2.28 | 17.4 | 2.66 | 28.3 | 801 |
| IB | 0.5 | 300 | 2.30 | 15.6 | 2.36 | 24.0 | 762 |
| IC | 0.5 | 350 | 2.05 | 17.8 | 2.72 | 29.3 | 731 |
| ID | 0.5 | 400 | 2.22 | 21.4 | 2.98 | 37.1 | 749 |
| IE | 0.5 | 450 | 2.27 | 24.1 | 3.11 | 42.5 | 699 |
| IF | 0.5 | 500 | 2.20 | 23.4 | 2.92 | 40.1 | 701 |

EXAMPLE I

A spinnning solution was selected containing sulfonated poly-p-phenylene terephthalamide having a sulfur content of 1.7 percent by weight as sulfonic acid groups attached to the aromatic nuclei. The spinning solution contained 20 percent by weight of the sulfonated poly-p-phenylene terephthalamide dissolved in 100 percent concentrated sulfuric acid.

The spinning solution initially was prepared from poly-p-phenylene terephthalamide having an inherent viscosity of 4.8 by dissolving in 100 percent concentrated sulfuric acid which was heated at 90° C. for 10½ hours and at 95° C. for 15¼ hours. The inherent viscosity of the resulting spinning solution of sulfonated poly-p-phenylene terephthalamide was 2.7.

The spinning solution while at a temperature of about 86° C. was extruded at a rate of 40 meters/minute employing a ten-hole spinneret, each hole being 50 microns in diameter, through a ½ inch air gap and into a water bath maintained at 4° C.

The fibers were passed to a take-up unit, the speed of the take-up roll of which was adjusted so that the rate of

EXAMPLE II

Example I was repeated with the exceptions indicated.

A spinning solution was selected containing sulfonated poly-p-phenylene terephthalamide having a sulfur content of 0.57 percent by weight as sulfonic acid groups attached to the aromatic nuclei. The spinning solution contained 20 percent by weight of the sulfonated poly-p-phenylene terephthalamide dissolved in 99.6 percent concentrated sulfuric acid.

The spinning solution initially was prepared from poly-p-phenylene terephthalamide having an inherent viscosity of 4.8 by dissolving in 99.6 percent concentrated sulfuric acid, which was heated at 90° C. for 28½ hours. The inherent viscosity of the resulting spinning solution of sulfonated poly-p-phenylene terephthalamide was 3.2 as was the inherent viscosity of the as-spun fibers.

The single filament properties of the resulting fibers are reported in Table II, as are the properties of a control wherein the washed and dried as-spun fibers were not subjected to the heat treatment.

TABLE II

| Fiber Sample | Heat Treatment Stretch Percent | Heat Treatment Temp. °C | DPF | Ten, g/d | Elong, % | TE[1] | Mod, g/d |
|---|---|---|---|---|---|---|---|
| Control | — | — | 2.42 | 14.3 | 5.80 | 34.5 | 337 |
| IIA | 0.5 | 250 | 1.99 | 18.1 | 2.45 | 28.3 | 802 |
| IIB | 0.5 | 300 | 2.13 | 18.4 | 2.73 | 30.4 | 738 |
| IIC | 0.5 | 350 | 2.10 | 17.5 | 2.42 | 27.3 | 774 |
| IID | 0.5 | 400 | 2.13 | 17.3 | 2.33 | 26.4 | 747 |
| IIE | 0.5 | 450 | 2.12 | 17.7 | 2.27 | 26.7 | 785 |
| IIF | 0.5 | 500 | 2.11 | 15.8 | 2.03 | 22.5 | 703 |

EXAMPLE III

Example I was repeated with the exceptions indicated.

A spinning solution was selected containing sulfonated poly-p-phenylene terephthalamide having a sulfur content of 0.51 percent by weight as sulfonic acid groups attached to the aromatic nuclei. The spinning solution contained 20 percent by weight of the sulfonated poly-p-phenylene terephthalamide dissolved in 99.6 percent concentrated sulfuric acid.

The spinning solution initially was prepared from poly-p-phenylene terephthalamide having an inherent viscosity of 4.8 by dissolving in 99.6 percent concentrated sulfuric acid which was heated at 90° C. for 22½ hours. The inherent viscosity of the resulting spinning solution of sulfonated poly-p-phenylene terephthalamide was 3.8 as was the inherent viscosity of the as-spun fibers.

The single filament properties of the resulting fibers are reported in Table III, as are the properties of a control wherein the washed and dried as-spun fibers were not subjected to the heat treatment.

TABLE III

| Fiber Sample | Heat Treatment Stretch Percent | Heat Treatment Temp °C | DPF | Ten, g/d | Elong, % | TE[1] | Mod, g/d |
|---|---|---|---|---|---|---|---|
| Control | — | — | 2.78 | 14.4 | 4.37 | 30.1 | 399 |
| IIIA | 0.5 | 250 | 2.44 | 19.0 | 3.37 | 34.9 | 621 |
| IIIB | 0.5 | 300 | 2.52 | 17.7 | 3.03 | 30.9 | 630 |
| IIIC | 0.5 | 350 | 2.43 | 18.0 | 2.86 | 30.5 | 652 |
| IIID | 0.5 | 450 | 2.15 | 15.9 | 2.31 | 24.2 | 661 |
| IIIE | 0.5 | 500 | 2.20 | 14.1 | 2.15 | 20.7 | 633 |

EXAMPLE IV

Example I is repeated with the exceptions indicated.

A spinning solution is selected containing sulfonated poly-p-phenylene terephthalamide having a sulfur content of 0.96 percent by weight as sulfonic acid groups attached to the aromatic nuclei. The spinning solution contains 20 percent by weight of the sulfonated poly-p-phenylene terephthalamide dissolved in 99.6 percent concentrated sulfuric acid.

The sulfonated polymer initially is prepared from poly-p-phenylene terephthalamide having an inherent viscosity of 5.0 by dissolving in 30 percent oleum at 25° C. The resulting mixture is stirred for 40 minutes at 25° C. during which time the sulfonation occurs. The inherent viscosity of the spinning solution and of the as-spun fiber is 2.5.

Upon heat treatment fibers having substantially similar physical properties are obtained.

Although the invention has been described with preferred embodiments it is to be understood that variations and modifications may be employed without departing from the concept of the invention as defined in the following claims.

We claim:

1. An improved process for preparing wholly aromatic polyamide fibers comprising:
   a. providing a spinning solution containing from about 10 to 30 percent by weight of a wholly aromatic polyamide having (1) chain extending bonds from the aromatic nuclei thereof which are coaxial or parallel and oppositely directed, and (2) a sulfur content of at least 0.5 percent by weight as sulfonic acid and/or sulfonate groups attached to said aromatic nuclei of said wholly aromatic polyamide;
   b. solution spinning said spinning solution of said wholly aromatic polyamide through a spinning jet to provide as-spun fibers having an inherent viscosity of at least 1.0; and
   c. thermally treating said as-spun fibers at a temperature within the range of about 150° to 650° C. while under a longitudinal tension sufficient to maintain a constant length or to elongate the fibers up to about 5 percent of the as-spun length thereby producing fibers having a single filament tenacity of at least 15 grams per denier, an elongation of at least 1.5 percent, and an initial modulus of at least 400 grams per denier.

2. An improved process for preparing wholly aromatic polyamide fibers in accordance with claim 1 wherein said wholly aromatic polyamide has a sulfur content of about 0.5 to 10 percent by weight.

3. An improved process for preparing wholly aromatic polyamide fibers in accordance with claim 1 wherein said wholly aromatic polyamide is sulfonated poly-p-phenyleneterephthalamide.

4. An improved process for preparing wholly aromatic polyamide fibers in accordance with claim 1 wherein said sulfur content initially is imparted to said wholly aromatic polyamide while dissolved in concentrated sulfuric acid at a temperature of about 75° to 95° C. for a period of about 14 to 50 hours.

5. An improved process for preparing wholly aromatic polyamide fibers in accordance with claim 1 wherein said sulfur content initially is imparted to said wholly aromatic polyamide while dissolved in fuming sulfuric acid at a temperature not exceeding about 25° C. for a period not exceeding about 1 hour.

6. An improved process for preparing wholly aromatic polyamide fibers in accordance with claim 1 wherein said spinning solution contains about 18 to 23 percent by weight of said sulfur-containing wholly aromatic polyamide.

7. An improved process for preparing wholly aromatic polyamide fibers in accordance with claim 1 wherein said spinning solution is solution spun employing dry-jet wet-spinning.

8. An improved process for preparing wholly aromatic polyamide fibers in accordance with claim 1 wherein during said solution spinning of step (b) said fibers are wound-up at speeds of about 2 to 6 times greater than the theoretical jet speed.

9. An improved process for preparing wholly aromatic polyamide fibers in accordance with claim 1 wherein said as-spun fibers have an inherent viscosity of about 1.0 to 7.0.

10. An improved process for preparing wholly aromatic polyamide fibers in accordance with claim 1 wherein said as-spun fibers are washed and dried prior to said thermal treatment of step (c).

11. An improved process for preparing wholly aromatic polyamide fibers in accordance with claim 1 wherein said as-spun fibers are thermally treated at a temperature of about 350° to 550° C.

12. An improved process for preparing wholly aromatic polyamide fibers in accordance with claim 1 wherein said as-spun fibers are thermally treated in an inert gaseous atmosphere.

13. An improved process for preparing wholly aromatic polyamide fibers comprising:
a. providing a spinning solution containing from about 10 to 30 percent by weight of a wholly aromatic polyamide having (1) chain extending bonds from the aromatic nuclei thereof which are coaxial or parallel and oppositely directed, and (2) a sulfur content of about 0.5 to 10 percent by weight as sulfonic acid and/or sulfonate groups attached to said aromatic nuclei of said wholly aromatic polyamide;
b. solution spinning said spinning solution of said wholly aromatic polyamide through a spinning jet to provide as-spun fibers having an inherent viscosity of about 1.0 to 7.0 while employing a wind-up speed about 2 to 6 times greater than the theoretical jet speed; and
c. thermally treating said as-spun fibers at a temperature within the range of about 150° to 650° C. while under a longitudinal tension sufficient to maintain a constant length or to elongate the fibers up to about 5 percent of the as-spun length thereby producing fibers having a single filament tenacity of at least 15 grams per denier, an elongation of at least 1.5 percent, and an initial modulus of at least 400 grams per denier.

14. An improved process for preparing wholly aromatic polyamide fibers in accordance with claim 13 wherein said wholly aromatic polyamide has a sulfur content of about 0.5 to 3 percent by weight.

15. An improved process for preparing wholly aromatic polyamide fibers in accordance with claim 13 wherein said wholly aromatic polyamide is sulfonated poly-p-phenyleneterephthalamide.

16. An improved process for preparing wholly aromatic polyamide fibers in accordance with claim 13 wherein said sulfur content initially is imparted to said wholly aromatic polyamide while dissolved in concentrated sulfuric acid at a temperature of about 75° to 95° C. for a period of about 14 to 50 hours.

17. An improved process for preparing wholly aromatic polyamide fibers in accordance with claim 13 wherein said sulfur content initially is imparted to said wholly aromatic polyamide while dissolved in fuming sulfuric acid at a temperature not exceeding about 25° C. for a period not exceeding about 1 hour.

18. An improved process for preparing wholly aromatic polyamide fibers in accordance with claim 13 wherein said spinning solution contains about 18 to 23 percent by weight of said sulfur-containing wholly aromatic polyamide.

19. An improved process for preparing wholly aromatic polyamide fibers in accordance with claim 13 wherein said spinning solution is solution spun employing dry-jet wet-spinning.

20. An improved process for preparing wholly aromatic polyamide fibers in accordance with claim 13 wherein during said solution spinning of step (b) said fibers are wound-up at a speed of about 3 to 5 times greater than the theoretical jet speed.

21. An improved process for preparing wholly aromatic polyamide fibers in accordance with claim 13 wherein said as-spun fibers have an inherent viscosity of about 1.0 to 3.0.

22. An improved process for preparing wholly aromatic polyamide fibers in accordance with claim 13 wherein said as-spun fibers are washed and dried prior to said thermal treatment of step (c).

23. An improved process for preparing wholly aromatic polyamide fibers in accordance with claim 13 wherein said as-spun fibers are thermally treated at a temperature of about 350° to 550° C.

24. An improved process for preparing wholly aromatic polyamide fibers in accordance with claim 13 wherein said as-spun fibers are thermally treated in an inert gaseous atmosphere.

25. An improved process for preparing wholly aromatic polyamide fibers comprising:
a. providing a spinning solution containing about 18 to 23 percent by weight of sulfonated poly-p-phenyleneterephthalamide having a sulfur content of about 0.8 to 1.7 percent by weight as sulfonic acid and/or sulfonate groups attached to the aromatic nuclei of said poly-p-phenyleneterephthalamide;
b. solution spinning said spinning solution of sulfonated poly-p-phenyleneterephthalamide through a spinning jet to provide as-spun fibers having an inherent viscosity of about 1.0 to 3.0 while employing a wind-up speed about 3 to 5 times greater than the theoretical jet speed;
c. washing and drying said as-spun fibers; and
d. thermally treating said as-spun fibers while present in an inert gaseous atmosphere at a temperature within the range of about 350° to 550° C. while under a longitudinal tension sufficient to maintain a constant length or to elongate the fibers up to about 5 percent of the as-spun length thereby producing fibers having a single filament tenacity of at least 15 grams per denier, an elongation of at least 1.5 percent, and an initial modulus of at least 400 grams per denier.

26. An improved process for preparing wholly aromatic polyamide fibers in accordance with claim 25 wherein said sulfonated poly-p-phenyleneterephthalamide is initially formed while poly-p-phenyleneterphthalamide is dissolved in concentrated sulfuric acid at a temperature of about 75° to 95° C. for a period of about 14 to 50 hours.

27. An improved process for preparing wholly aromatic polyamide fibers in accordance with claim 25 wherein said sulfonated poly-p-phenyleneterephthalamide is initially formed while poly-p-phenyleneterephthalamide is dissolved in fuming sulfuric acid at a temperature not exceeding about 25° C. for a period not exceeding about 1 hour.

28. An improved process for preparing wholly aromatic polyamide fibers in accordance with claim 25 wherein said spinning solution employs concentrated sulfuric acid as the spinning solvent.

29. An improved process for preparing wholly aromatic polyamide fibers in accordance with claim 25 wherein said spinning solution is solution spun employing dry-jet wet-spinning.

30. An improved process for preparing wholly aromatic polyamide fibers in accordance with claim 25 wherein said as-spun fibers are thermally treated while present in said inert gaseous atmosphere at a temperature of about 450° to 500° C.

31. An improved process for preparing wholly aromatic polyamide fibers in accordance with claim 25 wherein said inert gaseous atmosphere in which said thermal treatment is carried out is nitrogen.

32. An improved process for preparing wholly aromatic polyamide fibers in accordance with claim 25 wherein said thermal treatment is carried out at a temperature in the range of about 350° to 550° C. for about 3 to 9 seconds.

* * * * *